United States Patent [19]

Lamb et al.

[11] 4,177,740

[45] Dec. 11, 1979

[54] APPARATUS FOR GENERATING HEAT FROM WASTE FUEL

[75] Inventors: Frank H. Lamb; Malcolm D. Lefcort, both of Vancouver; Petr Rada, North Vancouver, all of Canada

[73] Assignee: Enterprises International, Inc., Aberdeen, Wash.

[21] Appl. No.: 885,377

[22] Filed: Mar. 10, 1978

[51] Int. Cl.² ............................................. F23G 5/12
[52] U.S. Cl. .................................. 110/213; 110/283; 110/254
[58] Field of Search ............... 110/212, 254, 255, 283, 110/190, 213, 244

[56] References Cited

U.S. PATENT DOCUMENTS

| | | | |
|---|---|---|---|
| 3,601,069 | 8/1971 | Mancuso | 110/190 |
| 3,785,304 | 1/1974 | Stookey | 110/190 |
| 3,808,619 | 5/1974 | Vanderveer | 110/213 |
| 3,834,327 | 9/1974 | Hellstrom et al. | 110/216 |
| 4,063,521 | 12/1977 | Pech | 110/213 |

*Primary Examiner*—Kenneth W. Sprague

*Attorney, Agent, or Firm*—Seed, Berry, Vernon & Baynham

[57] ABSTRACT

A combustion apparatus having primary and secondary combustion chambers burns waste wood with an optional third chamber. The third chamber is used to blend the combustion products down to the desired process temperature. High pressure swirl air is admitted tangentially to the primary chamber above a burning fuel pile. The swirl air reacts with a small proportion of the pyrolized gases to maintain a steady temperature at the exit from the primary chamber. The swirl air also centrifugally separates particulate matter from the gas stream leaving the primary chamber. The total quantity of underfire and swirl air is closely controlled to maintain substoichiometric conditions in the primary chamber. Secondary air complete combustion of the pyrolized volatiles in the secondary chamber. The secondary air is admitted tangentially to establish a rotating mass of relatively cool combustion air adjacent to the walls of the secondary combustion chamber. The air reacts with the volatiles at the base of the secondary chamber, after the volatiles have first been forced radially outward by the presence of a discshaped flame holder in the inlet to the chamber.

13 Claims, 4 Drawing Figures

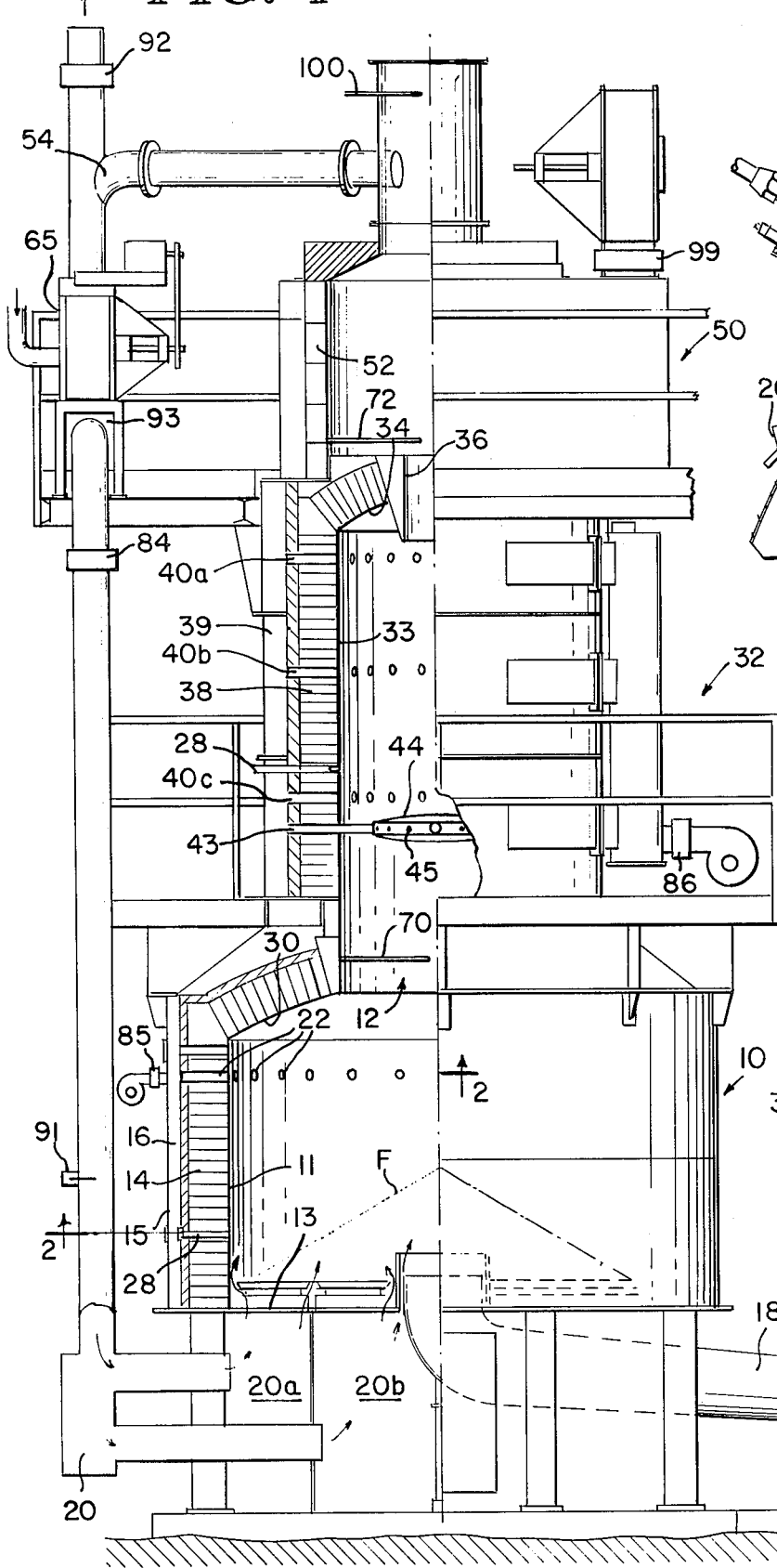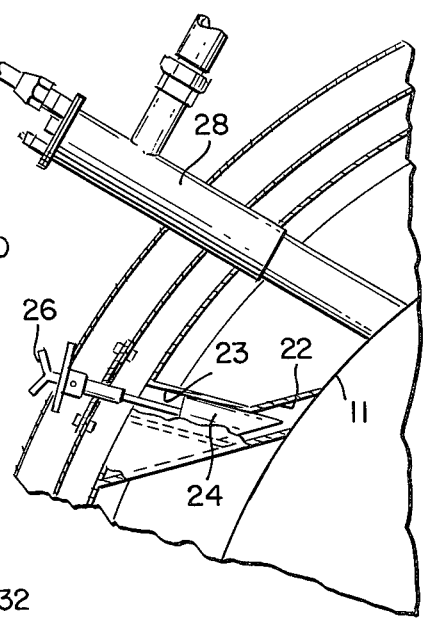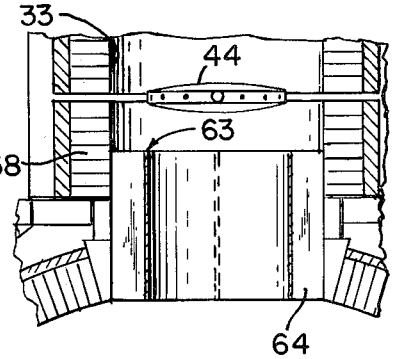

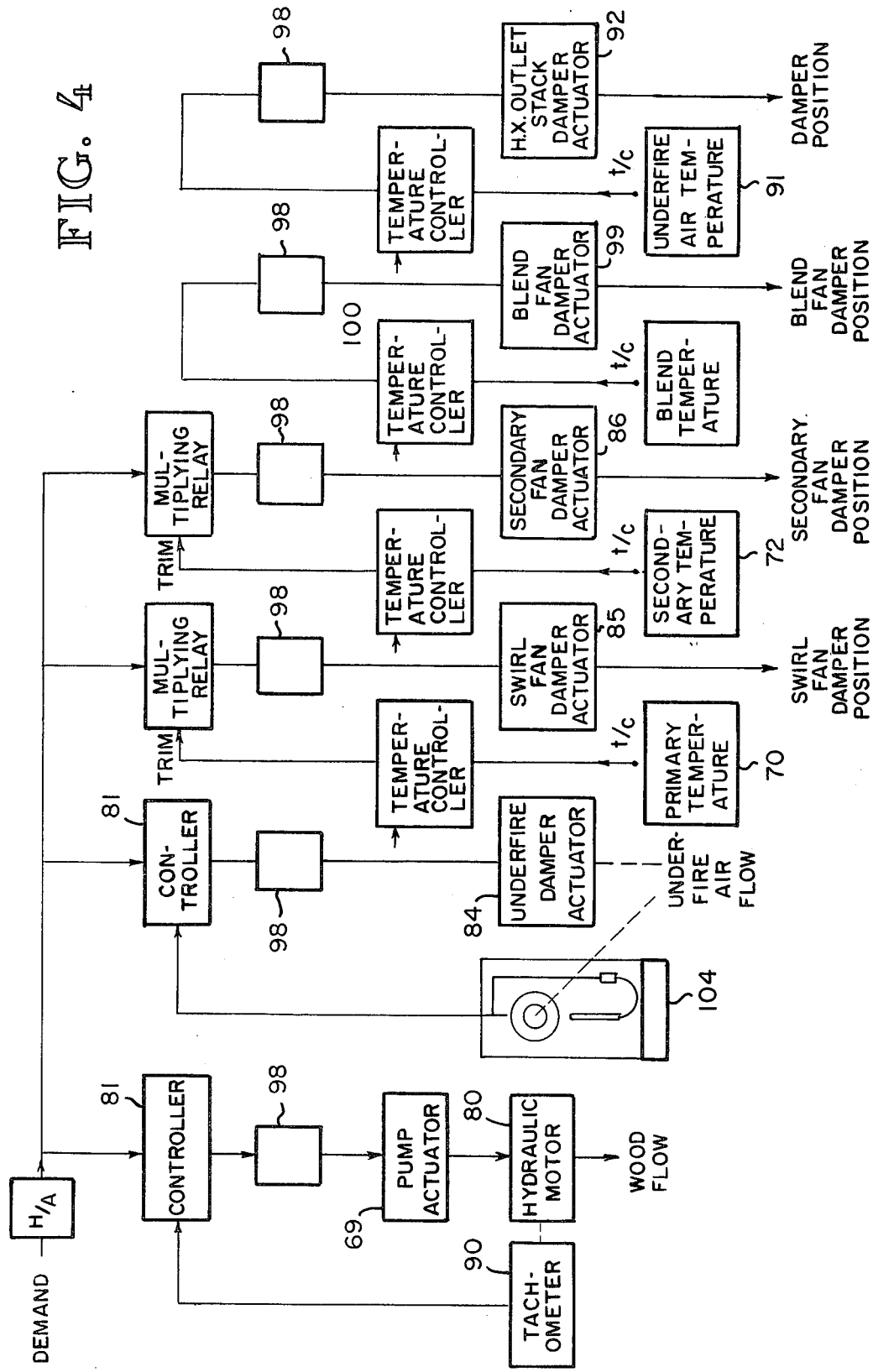

APPARATUS FOR GENERATING HEAT FROM WASTE FUEL

BACKGROUND OF THE INVENTION

1. Field of the Invention

This invention pertains to methods and apparatus for generating heat from particulate-laden gas or directly from waste fuels such as wood waste.

2. Description of the Prior Art

Wood waste fuel burners, commonly known as hog fuel burners, have generally been extremely inefficient in combustion, discharging undesirable amounts of gaseous and particulate pollution. In addition, when these burners are coupled to a boiler the gases emitted to the boiler for heating are dirty causing depositions on the heat transfer tubes of the boiler which require frequent and expensive cleaning. Frequently, the particulate matter in the exhaust gases is also highly abrasive to the boiler heat transfer elements. As a result, conventional practice is to build an extremely large furnace chamber for a boiler allowing the discharge gases from the burner to reach a very low velocity so that particulate matter in the exhaust can drop out of the gas stream. Also, because of retained particulate matter, the gas passages in the tube banks of conventional boilers are generally made wider to minimize passage obstruction. Gas velocities of 50 to 60 ft./sec. are common in hog or wastewood fuel boilers while velocities of 110 to 120 ft./sec. are the rule in oil and gas fired packaged or field erected boilers. And lastly, once through the boiler, the economizer and the air preheater, the exhaust gases in conventional hog fuel boilers have to be cleaned in multiple cyclones (multicones) followed, typically, by electrostatic precipitators. What the industry has long needed is a clean burning waste fuel burner which can deliver exhaust gases as clean as those produced by oil and gas burners. The same burner could also replace oil and gas burners on lime kilns, plywood veneer dryers, particle board dryers, lumber dry kilns, etc.

SUMMARY OF THE INVENTION

It is an object of this invention to provide a waste fuel burner which emits discharges of very minimal quantities of particulate materials within the levels permitted by local environmental regulations.

It is another object of this invention to provide a waste wood fuel burner which operates producing little slag or clinkers.

It is another object of this invention to provide a waste wood fuel burner which can effectively burn wet wood of 70% moisture content (wet basis).

It is still another object of this invention to provide a waste fuel burner that is self-regulating, easy to control and has fast response times to changes in the load comparable to conventional gas and oil burners.

It is another object to provide a waste fuel burner that burns wood of nominal ash content (e.g. 5% ash) and produces a residue that is free of clinkers (assuming the ash fusing temperature is not lower than 1700° F.)

Basically, these objects are met by method and apparatus which forms a conical pile of waste fuel, fed from below, with preheated underfire air percolating up through the pile in controlled amounts, drying and gasifying the waste fuel in the pile. The volatile gases driven off the pile by heat generated by the oxidation of the fixed carbon on the surface of the pile are then partially oxidized by additional combustion air introduced tangentially with a very vigorous swirl in a first or primary combustion chamber with the total amount of combustion air admitted to the primary chamber being maintained at less than stoichiometric proportions so that the temperature in the primary combustion chamber remains lower than that necessary to melt the natural ash, dirt or other inorganic substances in the fuel. The additional or swirl air is introduced in an amount necessary to maintain a steady temperature at the exit of the primary chamber and is dependent upon the moisture content and type of fuel. The swirl air also forces particulate out of the gas stream leaving the primary chamber. The volatile gases are discharged from the throat of the primary combustion chamber around an air cooled disc or flame holder which forces the gases, and any entrained particulate matter, out to the walls of the throat, thereby causing such entrained matter, if any, to centrifugally separate and fall back into the primary chamber. That is, the flame holder serves as a barrier against the particulate but allows passage of gases therearound. The volatile gases move around the disc shaped flame holder into a second combustion chamber where secondary combustion air is introduced to an amount above stoichiometric proportions for complete combustion. The secondary air introduced in the secondary combustion chamber is directed tangentially. Preferably, the combustion air introduced to the primary and secondary chambers is introduced on the outside of a refractory lining to cool the lining and increase its life. Preferably, also, the secondary combustion air introduced in the secondary combustion chamber can be introduced at various axial locations in that chamber to regulate the position of the flame within the chamber. Finally, if desired, additional blend air can be added to the discharge of the secondary chamber to cool the air for industrial purposes other than boiler heat.

The swirl air and secondary combustion air combine or interact dependent upon moisture content of the fuel to maintain good separation of the particulate from the gas stream leaving the primary chamber thus keeping the particulate out of the secondary chamber where high temperatures could cause slag formation. For example, as moisture content rises the temperature in the primary chamber will drop causing a demand for more swirl air to raise the combustion temperature in the primary chamber. This swirl air will vigorously separate the particulate by centrifugal separation. If moisture content drops, the temperature in the primary chamber will increase thus reducing the need for swirl air to maintain the steady exit temperature. As swirl air is reduced however the secondary air begins to shift downwardly because of the reduced pressure in the primary chamber thus diverting particulate trying to leave the primary chamber back into the primary chamber. That is, the secondary combustion air travels down in a spiral along the wall of the secondary chamber, then moves across the exit of the primary chamber and joins with the upwardly rising inner vortex of combustion gases above the flame holder. Particulate is swept back down into the primary chamber by this action.

In a second embodiment a cylindrical restriction or pressure isolator fitted with a multiplicity of radial vanes is coupled to the air cooled flame holder. The restriction serves to isolate the primary chamber from the secondary chamber air by imposing an additional resistance to tangential secondary combustion air movement into the two primary chamber but, at the same time permits the free fall of any separated particulate matter back into the primary chamber.

A unique aspect of the invention is that while advantageously used for a wood waste burner the primary and secondary chambers can be added to any source of dirty particulate-laden combustible gas and effectively burn the gas to provide a source of useful heat and remove the particulate for meeting environmental emission standards. As an example the primary chamber can be coupled directly to the exhaust of a coking operation for burning the gases and removing particulate from the exhaust.

BRIEF DESCRIPTION OF THE FIGURES OF THE DRAWING

FIG. 1 is an axial partial section of a waste fuel burner embodying the principles of the invention.

FIG. 2 is a fragmentary section taken along the line 2—2 of FIG. 1.

FIG. 3 is a fragmentary detail section of a second embodiment incorporating a pressure isolator.

FIG. 4 is a schematic pneumatic control diagram.

DETAILED DESCRIPTION OF THE PREFERRED EMBODIMENTS

The burner includes a primary combustion chamber 10 having an internal side wall 11, a discharge opening 12 and a bottom 13. The chamber is lined with refractory material 14 which is spaced from an outer metalic shell 15 by an air cooling passage 16.

Fuel (where the combustible material is a solid wood waste rather than merely particulate-laden gas) is fed from a hopper by a conveyor 18 of conventional construction either of the screw or ram type and is pushed into the form of a conical pile F. Preheated underfire combustion air is carried by a conduit 20 and directed into two chambers 20a and 20b. The chambers are in effect concentric rings each being fed a regulated desired amount of air to percolate or blow up through the pile. This air is preheated to about 500° F. The ring 20a being located beneath the outer less thick level of the conical pile is held to a lower air pressure so that blow holes will not be formed in the pile. Blow holes disturb the gasification and result in underfire air completing the combustion of the volatiles generated in the region of the blow hole, leading to high temperatures in the same region with attendant ash fusion and clinker generation.

High pressure swirl air is admitted through tuyeres 22. The tuyeres are at an angle to the side wall 11 so that the air is admitted tangentially and the resulting swirl generates centrifugal forces which drive the heavier non-combusted materials to the outer wall 11 while allowing the volatile gases to pass upward through the throat of the primary chamber. The tuyeres 22 are located high up in the chamber side wall so that the air introduced will not disturb the surface of the pile of fuel. The tuyeres have a wedge-shaped portion 23 with a plug wedge 24 that is externally adjustable by a handle 26. Thus each of the tuyeres which are circumferentially spaced around the primary combustion chamber are individually adjustable to regulate the exact amount of air and the velocity of this air introduced into the primary combustion chamber.

The secondary chamber also is provided with a side wall 33, a roof 34, an outlet 36 and a refractory lining 38 on the side walls and roof. The refractory lining is separated from the outer shell by an air passage 39 for cooling the refractory lining. Additional or secondary combustion air is introduced at tuyeres 40a, 40b, and 40c which are circumferentially and axially spaced within the secondary combustion chamber. These tuyeres are all adjustable in the same manner as the tuyeres of the primary combustion chamber. The axial positioning of the tuyeres is effective for adjusting the location where the air is introduced into the secondary chamber and assists in positioning the flame for various types of fuels and moisture contents of fuels.

As best shown in FIG. 1, the volatile gas passing through discharge 12 from the primary chamber works its way past an air cooled horizontal, disc shaped flame holder, 44, upon entering the secondary chamber. The flame holder is positioned in the center of the secondary chamber, below the bottom row of tuyeres 40c and causes the primary chamber gases to flow radially outward and around the flame holder forming again directly above the flame holder in an inner vortex. The flame holder could be ceramic but in the preferred embodiment is air cooled by admitting secondary air via hollow support pipes 43, the flow of cooling air being established by bleeding such air from the outer surface of the flame holder via a plurality of small diameter bleed holes 45.

Secondary combustion air is admitted tangentially to the secondary chamber via three rows of adjustable tuyeres 40a, 40b, and 40c. Because of the roof 34 and choke 36, the secondary combustion air spirals down the walls of the secondary chamber to meet the mixture of volatile gases and moisture spiraling up around the flame holder from the primary chamber. The two flows merge and, still swirling, flow radially inward above the flame holder where final combustion takes place.

Combustion is completed in this inner vortex of upward spiralling flame centered above the flame holder and along the axis of the secondary chamber. The inner vortex is surrounded, and the refrectory is protected, by the outer vortex of downward spiraling combustion air. The final products of combustion leave the secondary chamber through the choke 36 still spiraling, at temperatures which, depending upon the moisture content of the waste fuel and the quantity of excess air, can reach 3000° F.

The flame holder also serves as a barrier and prevents the secondary chamber inner vortex from drawing primary chamber particulate material up into the secondary chamber.

Should some primary chamber particulate find its way out of the primary chamber into the primary chamber throat and then past the flame holder into the secondary chamber, the flame holder forces it out towards the walls where it is acted upon by the vigorous outer vortex of the secondary chamber. Because of the smooth and continuous transition of the secondary chamber walls with those of the throat of the primary chamber, such elusive particles then fall back down into the primary chamber where the combustible portion will later be removed.

In the embodiment of FIG. 3 a pressure isolator 63 is shown in the throat of the primary chamber below the flame holder 44. The isolator shown is a thin walled circular cylinder supported by a plurality of radial vanes 64 of the same axial length as the circular cylinder which extend from the outer surface of said cylinder to the throat walls. The entire pressure isolator can be air cooled in a similar manner to the flame holder.

The purpose of the pressure isolator is to isolate the primary chamber from secondary chamber combustion air. Because of the radial vanes the resistance presented to the downward spiraling secondary combustion air is high (the radial vanes destroy the angular momentum) the tendency for this air to enter the primary chamber is minimized. The primary chamber volatiles, however, readily find their way up through the center of the pressure isolator and into the secondary chamber. Any particulate matter brought with these gases into the secondary chamber is thrown outwards as before and because of the open passages between the refractory walls and the outer surface of the central cylinder, falls back down into the primary chamber.

The quantity of high pressure swirl air admitted to the primary chamber is varied according to the primary chamber exit temperature measured by thermocouple 70. Should this temperature fall too low and jeopardize either the rate of gasification in the primary chamber or continuous ignition in the secondary chamber, then the amount of primary swirl air is increased by the burner controls. Similarly, if the primary chamber exit temperature rises above an acceptable limit, and possibly melt, or, at least, cause to coalesce some of the noncombustible matter in the fuel, then the amount of primary swirl air is decreased by the burner controls.

In the latter case the reduction of swirl air will reduce the centrifugal separation forces on primary chamber particulate matter. However, this reduction will be offset by an increase in the centrifugal separation forces in the secondary chamber as follows: the increase in volatile matter reaching the secondary chamber will produce higher temperatures in this chamber as measured by thermocouple 72. The secondary chamber controls will then call for more secondary air to lower the secondary chamber exit temperature. This additional secondary air results in higher tengential velocities at the walls of the secondary chamber leading to an increase in centrifugal separation forces in this chamber.

Conventional gas burners 28 are mounted in the sides of the primary and secondary chamber. The primary chamber gas burner serves to ignite the fuel pile on start-up while the secondary chamber burner serves to preheat the secondary chamber and complete the combustion of the initial low temperature gases coming from the primary chamber during start-up.

To summarize the principle of operation, most conventional hog fuel or waste fuel burners are run with an air supply considerably greater than that necessary for stoichiometric combustion. Stoichiometric combustion, as is well known, is the precise amount of air necessary to obtain complete combustion of the organic materials in the waste fuel. This quantity of air will vary depending on moisture content and the nature of the fuel. Conventional hog fuel burners burn intentionally with about 80% more combustion air than is needed for stoichiometric combustion. The reason for this is that because the moisture content, and nature of the fuel is continuously varying the prior art burners overcompensate to assure that they get above stoichiometric so that combustion is complete and no undesirable smoke is formed. Generally, however, in operation these prior art burners reach excess air levels of up to 200%. This is extremely wasteful since the air must be delivered by blowers and reduces the final exhaust temperature because of the dilution of the heated gas with excess cool air. The invention described in this application burns considerably below stoichiometric proportions in the primary combustion chamber where slag-forming noncombustible material is found and only about 20% excess of stoichiometric in the secondary chamber. Furthermore, since all of the drying of the fuel occurs in the primary combustion chamber the gases reaching the secondary combustion chamber are uniform in nature allowing fuels up to 70% moisture content to be burned with good performance. By running at such a low excess air the temperatures in the primary chamber can be easily maintained below 1600° F.

Other advantages of this invention are that it can be adjusted to operate with a low volume of fuel or a high volume of fuel being variable from approximately x million Btu/hr to x/5 million Btu/hr where x is the burner rating; since not only can the feed of fuel be controlled quickly, but the underfire air coming in through conduit 20 can also be shut down quickly giving a response time in changing the output Btu/hr of the heater of less than 1 minute. This is to be compared to conventional prior art pile burners which require as much as 30 minutes to change their Btu output. The advantage of the quick response time is that the demands of the boiler can be more quickly met. Still another advantage is that since very little clinker or slag formation is formed in the primary and secondary chambers only very infrequent cleaning is needed and the cleaning is primarily limited to dry ash removal. Since the combustion air is passed over the refractory lining the lining has a much longer life because it seldom exceeds temperatures of about 1200° F. even when the highest temperature region of the flame in the secondary chamber is as high as 3000° F. Still further, with applicant's invention, the size and quality of the pieces of fuel fed to the pile is not critical whereas in the prior art, many systems require that the fuel be first pulverized or made of uniform size before it can be efficiently burned.

The discharge gases from the secondary chamber 32 can go direct to the boiler and because of their cleanliness the boiler can be small and obtain high heat transfer by maintaining the high velocity of the gases. If used for other industrial purposes requiring a lower temperature the gases can be mixed with additional outside air in a blend chamber 50 with its discharge going to a kiln dryer or other industrial use. Part of the hot gases are tapped off via conduit 54 and used to preheat underfire air in a heat exchanger 65.

The description of the control schematic shown in FIG. 4 will further illustrate the principle of operation.

BTU demand of the heat consuming process or equipment such as a boiler establishes burner output. In an actual installation steam pressure (boiler), dry bulb temperature (dry kiln) or tail end temperature (rotary dryer) alter the burner's BTU demand set point.

BTU demand controls the air and wood feed rate. There are three fans supplying underfire, swirl and secondary air. Each fan's output is affected by the demand signal. Fan output is controlled by an outlet damper at each fan.

The BTU demand signal is fed in parallel to: (1) an hydraulic pump 69 which powers an hydraulic motor 80, the motor 80 drives a wood supply conveyor which delivers wood waste to a conventional reciprocating ram stoker 82; (2) the underfire fan damper actuator 84; (3) the swirl air fan damper actuator 85; and (4) the secondary air fan damper actuator 86.

As demand increases, each of the fan outputs and the wood flow increase. Conversely, as demand decreases the wood and air supplied decrease.

The speed of the hydraulic motor (i.e. wood flow) is maintained constant for that demand setting by comparing the output of a tachometer 90 with the demand setting and automatically adjusting the hydraulic pump actuator accordingly (via a conventional controller 81).

Overrides or trims are provided on the swirl air and secondary air quantities. The swirl air is trimmed by the temperature at the outlet from the primary chamber. This temperature is measured by a probe 70 at the outlet of the primary chamber 10. The secondary air is trimmed by either the temperature at the outlet from the secondary chamber or the oxygen level at that point. This temperature, for example, is measured by a probe 72 above the outlet of the secondary chamber 32.

The swirl air trim drops the primary chamber outlet temperature by providing less combustion air and thus burning less of the volatiles in this chamber. That is, as the temperature gets higher than a preset set point the quantity of swirl air is reduced to lower the primary chamber exit temperature. Since the reduced swirl air will reduce particulate separation due to less cyclonic action, particulate separation from the volatile gases is maintained by the cyclonic action of the secondary air immediately above the primary chamber outlet. Advantageously as swirl air is reduced because of high temperatures in the primary chamber (a condition of low moisture content in the wood) the quantity of secondary air is increased to prevent excessive temperatures in the secondary chamber. The additional secondary air will increase cyclonic action in the secondary chamber thus driving the particulate outwardly and downwardly back into the primary chamber. Finally the secondary air trim increases the secondary air to maintain outlet temperatures from the secondary chamber compatible with long refractory life. When oxygen is used to trim the secondary air (for example, on a boiler) then the secondary air is normally reduced to maintain a fixed excess air (15 to 20% nominally).

The underfire air is the gasifying air, that is, the air which provides the volatiles to be burnt above the pile and especially, in the secondary chamber. In fact, while all other air controls operate only on the cruder accuracy outlet damper position, the underfire air control operates on the pressure drop across an inlet orifice 104 to determine actual air flow. BTU demand calls for a certain underfire air flow which is then established by the outlet damper actuator 84.

The fresh underfire air is pre-heated in a heat exchanger 93. The underfire air supply temperature is controlled from a thermocouple 91 which controls an exhaust damper 92 from the hot gas side of the heat exchanger.

Manual or automatic selection controls 98 are provided in each control circuit to allow manual override of each trim control. The embodiment of the control system disclosed is pneumatic. However, electrical controls are also satisfactory.

While the preferred embodiments of the invention have been illustrated and described it should be understood that variations will be apparent to one skilled in the art without departing from the principles herein.

We claim:

1. A waste wood fuel burner comprising:
a primary combustion chamber having an outlet, an inlet and a side wall,
means at the inlet for supporting a pile of fuel,
means for feeding the pile,
means for guiding underfire air through said pile,
a secondary combustion chamber having an inlet, an outlet and a side wall,
means between the primary combustion chamber outlet and the secondary combustion chamber inlet for impeding movement of unburned particulate matter out of said primary combustion chamber but allowing free passage of volatile gases,
means introducing swirl air into said primary combustion chamber,
means for introducing secondary combustion air into said secondary combustion chambers, and
control means for limiting the swirl air to an amount when combined with said underfire air results in less than stoichiometric combustion in said primary combustion chamber, and for increasing secondary combustion air in said secondary combustion chamber for assuring more than stoichiometric combustion in said secondary combustion chamber.

2. The burner of claim 1, said means for introducing said secondary combustion air including guide means for directing the air tangentially along the secondary combustion chamber side wall and axially toward said secondary combustion chamber inlet.

3. The burner of claim 1, said means for introducing said swirl air including means for directing the air tangentially along the side wall of the primary combustion chamber.

4. The burner of claim 2, said secondary air guide means including a plurality of axially spaced air inlets, and means for regulating the opening of the air inlets for controlling the quantity of air passing into different axial levels of the secondary combustion chamber for controlling the position of the flame within the secondary combustion chamber.

5. The burner of claim 1, said primary and secondary combustion chambers each having a refractory lining within a metallic shell, said means for introducing swirl and secondary combustion air including means for guiding the air between the refractory linings and shells of said combustion chambers for cooling.

6. The burner of claim 1, said primary and secondary combustion chambers each having a refractory lining within a metallic shell, said means for introducing swirl and secondary combustion air including means for guiding the air between the refractory linings and shells of said combustion chambers, said means for introducing said swirl air including means for directing the air tangentially along the sidewall of the primary combustion chamber, and said secondary combustion air guide means including a plurality of axially spaced air inlets, and means for regulating the opening of the air inlets for controlling the quantity of air passing into different axial levels of the secondary combustion chamber for controlling the position of the flame within the secondary combustion chamber.

7. The burner of claim 1, said impeding means including a transverse surface axially in alignment with and above the primary combustion chamber outlet.

8. The burner of claim 7, said transverse surface being provided with air flow means for cooling the transverse surface.

9. The burner of claim 7, including means for blocking downwardly spiraling combustion air from said secondary combustion chamber into said primary combustion chamber while allowing free fall of particulate material.

10. The burner of claim 9, said blocking means including a radially vaned cylinder having an open center and vanes reaching the walls around the primary combustion chamber outlet.

11. The burner of claim 1, said control means including a demand control regulating the quantity of heat output desired from the burner by controlling the amount of underfire air and wood feed and by controlling the amounts of swirl and secondary air using temperature trim, to reach said desired heat output.

12. A device for burning particulate-laden combustible gases for reducing the quantity of particulate and generating useful heat for a subsequent process comprising:

a primary combustion chamber having an outlet, an inlet and a side wall, means for guiding the particulate-laden combustible gas into the primary combustion chamber, means for adding swirl air to said gas in said primary chamber in an amount to maintain the temperature of the gas at substoichiometric, means at the outlet of the primary chamber for allowing free passage of gas into the secondary combustion chamber but impeding free movement of particulate, means in the secondary combustion chamber for introducing secondary air in an amount greater than stoichiometric in an outer tengential vortex directed toward the primary combustion chamber outlet for mixing with the gas from the primary combustion chamber outlet in a central vortex above said impeding means, said secondary air pushing particulate down into said primary combustion chamber, and control means for adjusting the gas output generated, the swirl air and the secondary air to maintain said respective temperatures responsive to demand of heat by the subsequent process.

13. The device of claim 12, said control means including temperature sensors at the secondary and primary combustion chamber outlets.

* * * * *